Figure 1:
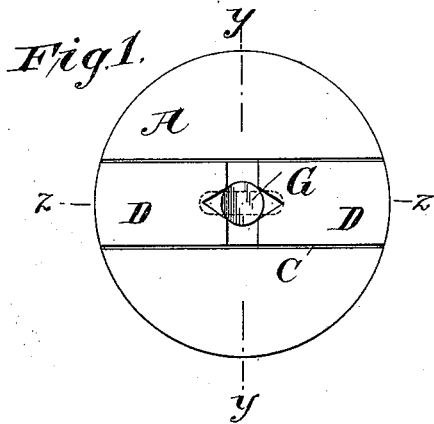

(No Model.)

C. T. PRATT.
DRILL CHUCK.

No. 449,135. Patented Mar. 31, 1891.

Attest:
C. W. Benjamin.
Alfred Ely.

Inventor:
Charles T. Pratt
by
D. Walter Brown,
attorney.

THE NORRIS PETERS CO., PHOTO-LITHO., WASHINGTON, D. C.

UNITED STATES PATENT OFFICE.

CHARLES T. PRATT, OF NEW HARTFORD, NEW YORK.

DRILL-CHUCK.

SPECIFICATION forming part of Letters Patent No. 449,135, dated March 31, 1891.

Application filed July 31, 1890. Serial No. 360,464. (No model.)

*To all whom it may concern:*

Be it known that I, CHARLES T. PRATT, a citizen of the United States, and a resident of New Hartford, in the county of Oneida and State of New York, have invented certain new and useful Improvements in Drill-Chucks, of which the following is a specification.

My invention relates to drill-chucks; and the object of the improvement is to provide means for the positive rotation of drills, reamers, and similar tools independently of the jaws of the chuck, and thereby prevent the slipping of the tool in the jaws, the wear of the jaws, and the injury to the tool.

The present application relates particularly to certain modifications and improvements in the chuck shown in my application for a patent filed April 29, 1890, Serial No. 349,951, which said application is now pending in the United States Patent Office. The said application, Serial No. 349,951, refers to a chuck wherein there is a movable piece, which piece has two arms, preferably placed perpendicular to a slot which is formed in the center of the piece for the purpose of engaging the end of a drill. The said piece therein adjusts itself to irregularities in the form of the drill by reason of the motion of the piece in a direction lengthwise of itself and transverse to the axis of rotation of the chuck.

The present application relates to a chuck in which there is a movable piece which has but a single arm, and wherein the piece adjusts itself to the irregularities in the form of the end of the shank of the drill by reason of the piece having a compound motion in the chuck—to wit, a motion in an arc of a circle around a point eccentric to the axis of rotation of the chuck, and also a rectilinear motion transverse to the said axis of rotation of the chuck. When a piece of this form and arrangement is used, the slot for the end of the drill may be placed in the piece either perpendicularly to the arm of the piece or in any other position. No matter how the slot may be placed the piece forms an equalizing driver, which imparts positive rotary motion to the drill, and at the same time adjusts itself to the want of regularity in the shank or end of the drill. Hitherto there has been great difficulty with drill-chucks which hold the drill-shank between jaws by friction, owing to the slipping of the drill in the jaws, whereby both the jaws and the drill-shank were cut and injured; but my device takes the strain of rotation from off the jaws and transmits it to the piece which engages with the end of the shank of the drill, and thereby rotates the drill. The jaws are therefore only required to hold the drill in its true alignment, but are not depended on to revolve the drill.

The drawings which accompany this specification show the piece applied to a certain form of chuck which has two jaws; but it is equally applicable to other forms of chucks—as, for example, to chucks with three jaws.

Figure 2:
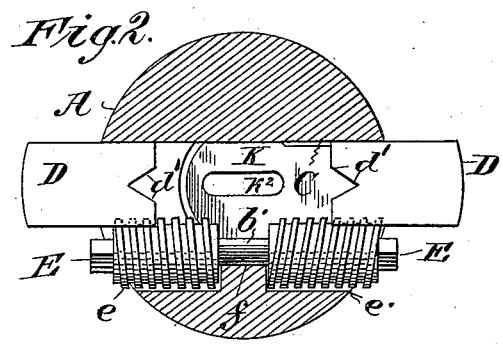
Figure 3:
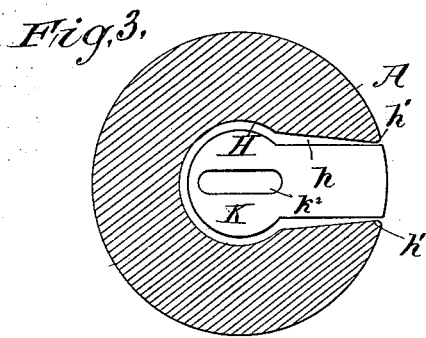
Figure 4:
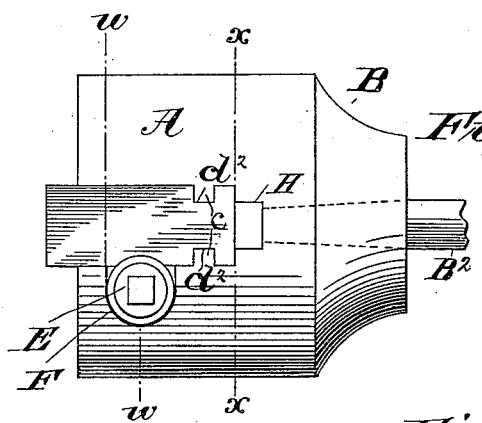
Figure 5:
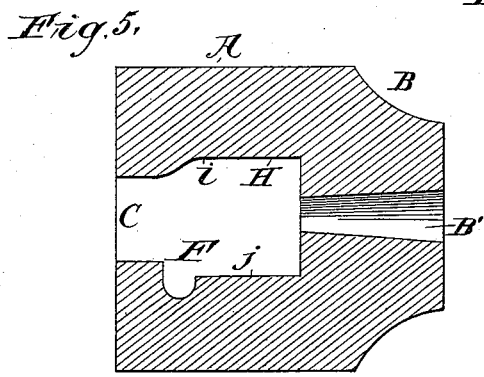
Figure 6:
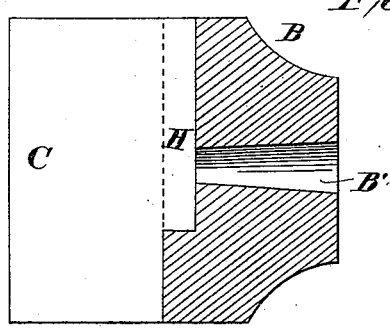
Figure 7:
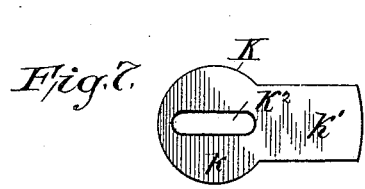
Figure 8:
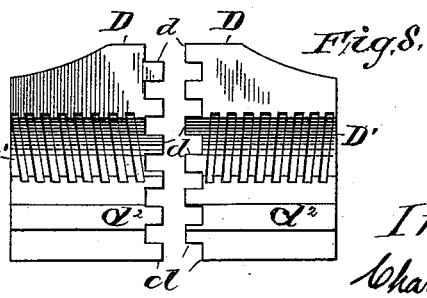

Referring to the drawings, Figure 1 is an end view of the chuck, showing the jaws grasping the shank of a drill. In this figure the jaws are shown flush with the circumference of the chuck; but, in fact, when the jaws are in the position shown in the figure they project slightly beyond the circumference of the chuck to either side. Fig. 2 is a cross-section of the chuck on the line W W of Fig. 4, showing the screw for operating the jaws. Fig. 3 is a cross-section of the chuck on the line X X of Fig. 4, showing the form of the chamber which contains the movable piece and the said piece in position in its chamber. Fig. 4 is a longitudinal elevation of the chuck. Fig. 5 is a longitudinal section of the chuck on the line Y Y of Fig. 1 with the jaws, screw, and piece removed, in order to show the form of the cavity in the chuck. Fig. 6 is a longitudinal section of the chuck on the line Z Z of Fig. 1, the plane of Fig. 6 being perpendicular to the plane of Fig. 5. Fig. 7 is a plan of the movable piece. Fig. 8 is a view of the jaws seen from below, and showing the threads for engaging with the actuating-screw.

The chuck A is preferably constructed of steel and in shape a cylinder with a conoidal part B, which is bored at B' for an arbor $B^2$. In the chuck A there is a recess C, which extends transversly through the said chuck and to a considerable depth, as shown in Figs. 5 and 6. The side walls of the recess C are parallel, and on the said walls are formed parallel guides $c\ c$, which engage with corresponding recesses $d^2\ d^2$ in the jaws D D. By reason of the said guides $c\ c$ the jaws D D are retained in the chuck and are also given a true rectilinear motion in the chuck A. The said jaws D D each have teeth d d with V-shaped notches d', and the teeth of one jaw may be placed opposite the interstices between the teeth of the other jaw. The said jaws D D also each have a section of a female-threaded screw D' D', the threads of one jaw being right handed and the threads of the other jaw being left handed, as shown. Engaging with the said threads D' D' is a screw E, which consists substantially of two screws E' E'—the one right handed, the other left handed, united by a spindle b'. The said screw is placed in a semi-cylindrical recess F, which passes transversely through the chuck A parallel to the jaws D D. The upper part of the walls of the said recess F may be slightly flattened to permit the ready insertion of the screw E, and the said recess F is formed with a central collar-like portion f, which fits upon the aforesaid spindle b'. The walls of the recess F are smooth and do not mesh with the screw E, and the said screw E has a shank on its end for engagement with a key for the purpose of rotating the said screw E and causing the jaws D D to approach and recede from each other.

*The movable piece.*—At the inner part of the aforesaid recess C in the chuck A is formed a circular chamber H. The said chamber H is preferably concentric with the axis of rotation of the chuck A, and the said chamber H connects with a passage-way h h, which extends transversely from said chamber H and preferably to the external surface of the chuck A. The said passage-way h is contracted outwardly, as seen in Fig. 3, to certain points h' h', which are eccentric to the axis of rotation of the chuck A. From the said points h' h' the said passage-way h rounds a little into the external surface of the chuck A, as shown in Fig. 3, for the purpose of giving clearance for the rotation of the movable piece K, as hereinafter described. In order to admit the piece K into its chamber H, the upper surface i of the said chamber is carried some distance toward the face of the chuck A or to the left in Fig. 5, and then dropped to the recess C, and the lower surface j' of the said chamber H is carried to the screw-recess F, as shown in Fig. 5. The bottom of the chamber H is preferably a plane surface, as shown in Figs. 5 and 6, and the under or inner sides of the jaws D D, which form the top of the said chamber H, are also plane surface. In the said chamber H is inserted the aforesaid movable slotted piece K. The said piece K is preferably formed as a flat sheet of metal equal in thickness to the depth of the chamber H, and the said piece K has a circular head $k$, which is of somewhat smaller diameter than the chamber H. From the aforesaid head $k$ proceeds a rectangular arm $k'$, which is of a length to just extend to the exterior of the chuck A, and is of a width to just easily fit the narrowest part h' h' of the passage-way h, as shown in Fig. 3. In the head $k$ there is a slot $k^2$, which may be either rectangular, square, or other shape, and may be placed in any direction as respects the arm $k$. The said slot $k^2$ is concentric with the axis of rotation of the chuck A and eccentric to the points h' h' of the passage-way h. Thus when the piece K is inserted in the chamber H the said piece K is capable of a certain amount of motion in an arc of a circle about the points h' h' as centers, and the piece K is also capable of a certain motion lengthwise of the arm $k$, or, what is the same thing, transverse to the axis of rotation of the chuck A. The degree of such motions is limited by the engagement of the head $k$ with the walls of the chamber H. The use of the said piece K is as follows: The end of a drill or reamer is inserted in the slot $k^2$, and the jaws D D are tightened upon the shank thereof. Now, if the said drill end or shank be irregularly formed the piece K will compensate for such irregularities by rotating somewhat from side to side in its chamber H, as may be necessary, and also by its motion transverse to the axis of rotation of the chuck A, if such movement be necessary for the compensation. Thus the jaws D D will be able to tighten upon the shank of the drill and bring the drill to a true alignment and center in the chuck A. At the same time the piece K will be revolved by the chuck A, and will communicate its motion to the drill, thereby relieving the jaws D D of the twisting and grinding strain which comes upon them, when the said jaws D D are relied on to revolve the drill. I prefer to use a drill or other tool which has the end of the shank flattened and to make the slot $k^2$ in the piece K of a rectangular form, as shown in Fig. 7.

It is evident that the details of the device may be modified without departing from my invention. Thus the passage-way h may be made rectangular, and the arm $k'$ of the piece K may be contracted inwardly without affecting the result.

Essentially my device consists of a slotted piece inserted in a chuck in such a manner that the said piece has a movement through a certain arc, from a centre which is eccentric to the axis of rotation of the chuck, and also preferably eccentric to the slot in the piece K. The said piece K may also have a rectilinear motion transverse to the axis of the chuck.

I claim—

1. In a chuck, a chamber extending outwardly from the axis of rotation of the chuck, and a slotted piece movably inserted in the said chamber, and the piece having a center of movement which is eccentric to the axis of rotation of the chuck, as herein described.

2. In a drill-chuck, a chamber contracted outwardly from the axis of rotation of the said chuck, and a slotted piece movably inserted in said chamber and slightly rotatable about the point of greatest contraction of the said chamber as a centre, as herein described.

3. In a drill-chuck, a chamber enlarged centrally in the chuck and contracted outwardly from the center of the chuck, and a slotted piece movably inserted in the said chamber and slightly rotatable about the point of greatest contraction as a center, as herein described.

4. In a drill-chuck, a movable piece inserted in a chamber in the chuck and having an enlarged part concentric to the axis of the chuck, and an arm extending outwardly from the enlarged part, and a slot for a drill end formed in the said enlarged part, as herein described.

5. In a drill-chuck, and in combination with means for gripping and aligning a drill, a chamber extending outwardly from the axis of rotation of the chuck, and a piece slotted for a drill end and movably inserted in said chamber, and the said piece having a center of movement in the chuck which is eccentric to the axis of rotation of the chuck and also eccentric to the slot, as described.

6. The combination of a chuck having a chamber with an enlarged part concentric to the axis of rotation of the chuck and a lateral passage connecting with the said chamber, a slotted piece movably inserted in said chamber and rotating about a point eccentric to the axis of rotation of the chuck, and a drill having a flattened end for insertion in the slotted piece, as herein described.

Signed at New Hartford, in the county of Oneida and State of New York, this 21st day of July, A. D. 1890.

CHARLES T. PRATT.

Witnesses:
GEORGE BENTON,
RICHARD R. DAVIS.